Nov. 21, 1950   C. S. McCLELLAN   2,530,531
STEREOSCOPIC PICTURE VIEWER
Filed March 13, 1946   2 Sheets-Sheet 1
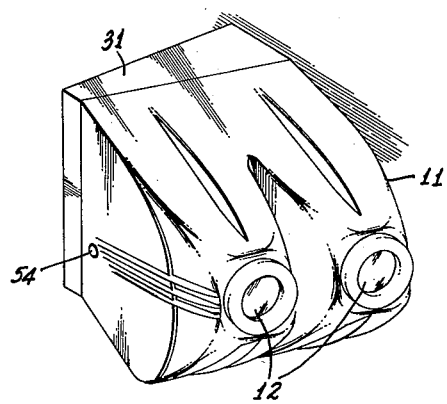
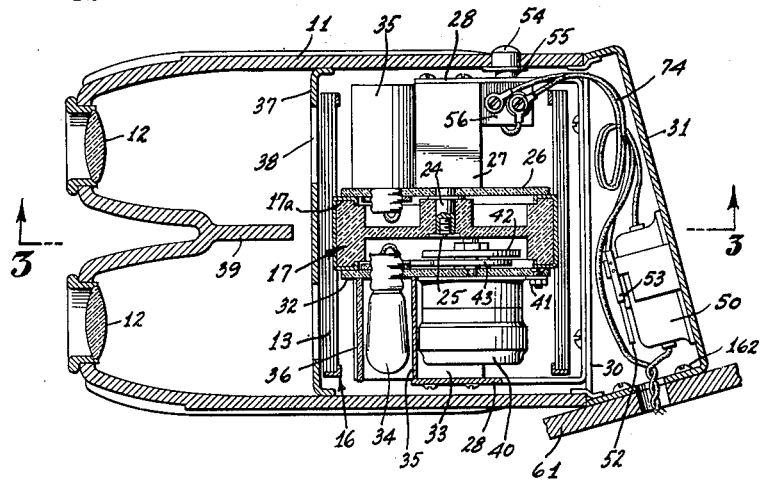
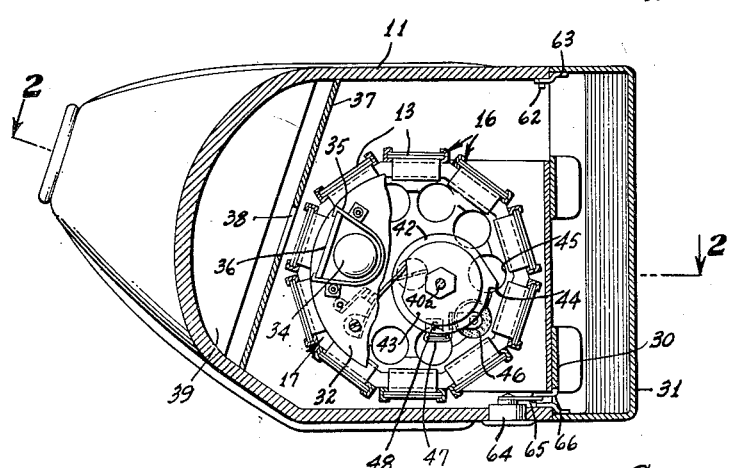
INVENTOR:
CLARENCE S. McCLELLAN.
BY
ATTORNEY.

Nov. 21, 1950  C. S. McCLELLAN  2,530,531
STEREOSCOPIC PICTURE VIEWER

Filed March 13, 1946  2 Sheets-Sheet 2

INVENTOR:
CLARENCE S. McCLELLAN.
BY
Joel N. Schwind
ATTORNEY.

Patented Nov. 21, 1950

2,530,531

UNITED STATES PATENT OFFICE 2,530,531

STEREOSCOPIC PICTURE VIEWER

Clarence S. McClellan, Santa Monica, Calif.

Application March 13, 1946, Serial No. 653,997

2 Claims. (Cl. 88—31)

This invention relates to picture displaying devices and has particular reference to picture displaying devices which automatically and sequentially display advertising or the like pictures.

The principal object of the invention is to provide a simple, compact and inexpensive device for displaying in succession a plurality of pictures.

Another object is to facilitate removal and replacement of pictures in a device of the above character.

Another object is to provide a multiple and sequential picture displaying device which is entirely automatic in operation.

Another object is to provide a compact device for sequentially displaying a plurality of third dimensional pictures.

The manner in which the above and other objects of the invention are accomplished will be readily understood on reference to the following specification when read in conjunction with the accompanying drawings wherein:

Fig. 1 is a perspective view of a picture displaying device embodying the present invention.

Fig. 2 is a sectional plan view through the device.

Fig. 3 is an elevational sectional view through the device and is taken substantially along the line 3—3 of Fig. 2.

Figure 4:
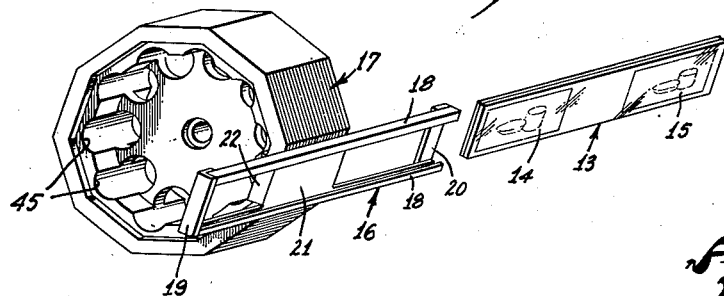
Fig. 4 is a perspective view of the slide supporting drum and one of the slide holders attached thereto.

Referring to the drawings, the picture displaying device comprises a casing 11 having a pair of inter-ocularly spaced lenses 12 through which an observer may view sequentially illuminated pictures. The latter are in the form of transparencies mounted on slides 13 (see also Fig. 4) and composed of right and left hand image components 14 and 15, respectively, of a scene. Each slide is successively aligned horizontally with the fields of view of the lenses 12 while the right and left hand image components of each picture are aligned laterally with said fields of view of the right and left hand lenses, respectively, (as viewed in Fig. 1) so that an observer, when looking through the device, will obtain a third dimensional view of the scene. For this purpose, the slides 13 having the right and left hand picture components of a scene thereon are removably mounted in holders generally indicated at 16. The latter are mounted on a polygonally shaped drum 17, each holder comprising a pair of spaced channels 18 having end pieces 19 and 20 integrally attached thereto to form a rigid unit. A center piece 21 also extending between the channels 18 has a pair of tabs 22 extending therefrom and bent around the rim 17a of the drum as shown in Fig. 2 to securely retain the holders in place. The slides 13 are inserted in the holders by slipping the same along the channels 18 until stopped by the cross pieces 19 forming lateral aligners for the slides.

Referring to Figs. 2 and 3, the drum 17 is rotatably mounted on a stub shaft 24 and is retained thereon by a cap screw 25. The shaft 24 is secured to a plate 26 of insulating material, the latter extending in juxtaposition with the drum and securely attached to a spacer block 27 which, in turn, is secured to one leg of a U-shaped bracket 28. Bracket 28 is secured to a cross piece 30 of an open box 31 of trapezoidal shape. A second plate 32 in juxtaposition with the side of the drum 17 opposite the plate 26 is secured to a spacer block 33 fixed to the other leg of the bracket 28.

A pair of electric lights 34 are threadably mounted in sockets formed in the plates 26 and 32 and are inclosed in housings 35 also carried by the plates 26 and 32. A window 36 is attached to each housing 35 in front of lights 34 and is formed of translucent material such as frosted or etched glass. These windows are located directly behind whichever of the slides 13 are in viewing position so as to uniformly illuminate the same.

In order to frame the right and left hand picture components of a scene being illuminated a mask 37 is fixedly attached to the interior of the casing 11 directly in front of the particular slide located in viewing position, said mask having rectangular openings 38 through which the slide may be viewed. Also, a wall 39 is formed along the center of the casing 11, as viewed in Fig. 2, to restrict the right and left hand image components to their respective right and left hand sides of the viewing device.

Means are provided to intermittently advance the drum at equally timed intervals so as to successively position the various slides in viewing position. For this purpose a relatively slow speed electric motor 40 is attached as by screws 41 to the plate 32. The motor shaft 40a of the former extends through the plate 32 and has secured thereon a toothed disk 42 and a switch control cam 43. The disk 42 has a tooth 44 thereon adapted to engage, in succession, each of a plurality of equally spaced arcuate detents 45 formed in the rim 17a of the drum 17 whereby, during each rotation of the disk 42, the drum will be advanced an angular amount equal to the angular spacings of the various slides on the drum.

For the purpose of centralizing the drum in its different positions a roller 46 is carried by a resilient mounting 47 secured at 48 to the plate 26, the mounting 47 yieldably forcing the roller 46 into one of the detents 45 when the drum is rotated to picture viewing position.

Means are provided for automatically energizing and maintaining the motor 40 in operation until all of the slides 13 carried thereby have been successively located in viewing position. For this purpose, a second motor 50 is mounted in the box 31 and carries a cam 52 adapted on rotation thereof to close a switch 153 located in the circuit of the motor 40. The speed of motor 50 is, in the present instance, equal to one-tenth the speed of motor 40 since ten slides are provided. However, in the event that different numbers of slides 13 are provided, the speed of motor 50 would be equal to the speed of the motor 40 divided by the number of such slides which are provided.

Means are provided for energizing the motor 50. Referring to Fig. 2, a push button 54 is slidably mounted in the wall of casing 11 and normally overlies a button 55 of a normally open switch 56 suitably secured to the bracket 28.

Figure 5:
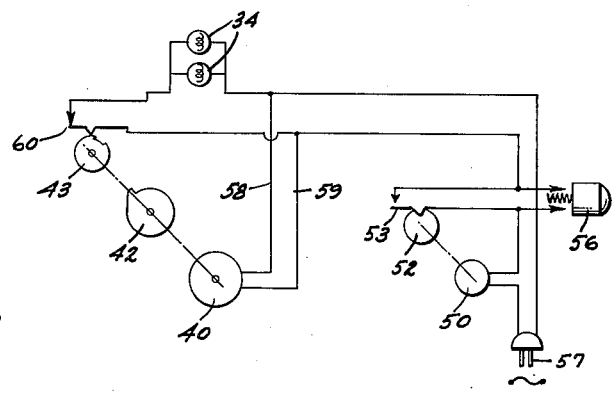
Fig. 5 is a schematic diagram of the electrical circuit incorporated in the device.

Describing now the electric circuit for the device, reference is had to the schematic diagram illustrated in Fig. 5 wherein it will be seen that the motor 50 is provided in series with the normally open switch 56 across a power inlet 57. Upon energization of the motor 50 by closing switch 56, the cam 52 will be rotated, closing switch 53 whereby to energize a circuit, including conductors 58 and 59, for the motor 40. The motor 40 will thus be energized during the complete revolution of the motor 50. The lights 34 are connected in parallel with the circuit of motor 40, and provided in the circuit for the lights 34 is a normally closed switch 60 controlled by the above mentioned cam 43 which is carried by the motor shaft of motor 40. The shape of cam 43 is such that it will cause the switch 60 to open the light circuit during advancement of the drum 17 by the toothed disk 42 but will close such circuit immediately upon the drum 17 coming to rest.

The box 31 is arranged to be securely attached to a wall or the like 61, as by screws 162, and the casing 11 is adapted to be readily removed therefrom to permit changing of the slides 13 or servicing of the unit. Referring to Fig. 3, the casing 11 is provided at the top thereof with pins 62 loosely mounted in tabs 63 extending from the box 31, thereby forming a hinge. A lock 64 is mounted on the lower end of the casing 11 and is provided with a latch 65 which, when rotated into locking position, latches a lug 66 extending from the cross piece 30 of the box 31, thereby preventing unauthorized removal of the casing. However, by releasing the lock and thereby withdrawing the latch 65 from the lug 66 the casing 11 may be readily removed.

Figure 6:
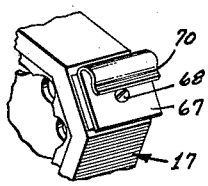
Fig. 6 is a fragmentary perspective view of a modified form of slide holder.

Fig. 6 illustrates a modified form of slide holder comprising a resilient clip 67 attached by a screw 68 to the drum 17 and having a bent over portion 70 under which a slide, as at 13, may be inserted, the resilient pressure of the portion 70 retaining the slide 13 in position.

Figure 7:
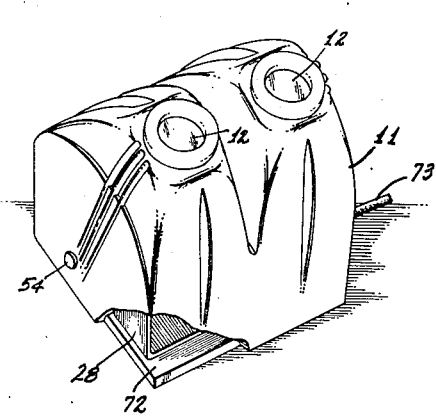
Fig. 7 is a perspective view of a modified form of picture displaying device.

Fig. 7 illustrates a modified form of the displaying device in which the bracket 28 (see also Fig. 2) is secured to a base 72 which, in turn, is secured to the casing 11. In this case, it is intended to mount the motor 50 in a different location and connect the same to the switch of the device through a flexible conductor 73 in the same manner as the conductor 74 (Fig. 2) is connected, thereby enabling the device to be moved about.

Having thus described the invention what I desire to secure by United States Letters Patent is:

1. A stereoscopic picture viewer comprising a rotary hollow drum having a plurality of equally spaced detents arranged around the inner circumference of the wall thereof, means rotatably supporting said drum, means on said drum for fixedly supporting a plurality of pairs of stereo picture transparencies around the periphery thereof and with the surfaces of said transparencies extending at right angles to lines extending radially from the center of said drum, the transparencies of each said pair overhanging the opposite ends of said drum, an illuminating device adjacent each of the opposite ends of said drum for illuminating said transparencies from the rear, a toothed member, and means supporting said member within said drum for rotation about an axis extending parallel to and eccentrically of said drum wherein a tooth of said member engages one of said detents during rotation of said member whereby to intermittently rotate said drum.

2. A stereoscopic picture viewer comprising a rotary hollow drum having a plurality of equally spaced detents arranged around the inner circumference of the wall thereof, means rotatably supporting said drum, means on said drum for fixedly supporting a plurality of pairs of stereo picture transparencies around the periphery thereof and with the surfaces of said transparencies extending at right angles to lines extending radially from the center of said drum, the transparencies of each said pair overhanging the opposite ends of said drum, an illuminating device adjacent each of the opposite ends of said drum for illuminating said transparencies from the rear, a toothed member, means supporting said member within said drum for rotation about an axis extending parallel to and eccentrically of said drum wherein a tooth of said member engages one of said detents during rotation of said member whereby to intermittently rotate said drum, and detenting means yieldably engaging successive ones of said detents during periods of rest of said drum.

CLARENCE S. McCLELLAN.

REFERENCES CITED

The following references are of record in the file of this patent:

UNITED STATES PATENTS

| Number | Name | Date |
|---|---|---|
| 778,998 | Passmore | Jan. 3, 1905 |
| 874,940 | Cole | Dec. 31, 1907 |
| 1,313,241 | Ashley | Aug. 19, 1919 |
| 1,519,808 | Christensen | Dec. 16, 1924 |
| 1,544,364 | Antoine et al. | June 30, 1925 |
| 2,006,297 | Eisemann | June 25, 1935 |
| 2,299,973 | Getten | Oct. 27, 1942 |
| 2,318,874 | Mast | May 11, 1943 |
| 2,364,793 | Jobe et al. | Dec. 12, 1944 |

FOREIGN PATENTS

| Number | Country | Date |
|---|---|---|
| 38,062 | Sweden | Feb. 12, 1912 |